(12) United States Patent
Beppu et al.

(10) Patent No.: US 8,252,401 B2
(45) Date of Patent: Aug. 28, 2012

(54) RELEASE SHEET AND PRESSURE-SENSITIVE ADHESIVE ARTICLE

(75) Inventors: Shiori Beppu, Saitama (JP); Toshio Sugizaki, Yokohama (JP)

(73) Assignee: Lintec Corporation (JP)

( * ) Notice: Subject to any disclaimer, the term of this patent is extended or adjusted under 35 U.S.C. 154(b) by 260 days.

(21) Appl. No.: 12/531,777

(22) PCT Filed: Mar. 4, 2008

(86) PCT No.: PCT/JP2008/053861
§ 371 (c)(1),
(2), (4) Date: Sep. 17, 2009

(87) PCT Pub. No.: WO2008/126515
PCT Pub. Date: Oct. 23, 2008

(65) Prior Publication Data
US 2010/0112262 A1    May 6, 2010

(30) Foreign Application Priority Data
Mar. 19, 2007   (JP) ................................. 2007-071638

(51) Int. Cl.
*B32B 3/00* (2006.01)
*D06N 7/04* (2006.01)

(52) U.S. Cl. ....... 428/40.1; 428/41.8; 428/141; 428/156

(58) Field of Classification Search ................. 428/40.1, 428/41.8, 141, 156
See application file for complete search history.

(56) References Cited

U.S. PATENT DOCUMENTS

| | | | |
|---|---|---|---|
| 6,365,254 B1 * | 4/2002 | Zoller et al. | 428/40.1 |
| 6,395,360 B1 * | 5/2002 | Takahira et al. | 428/40.1 |
| 2005/0074573 A1 * | 4/2005 | Bowen et al. | 428/40.1 |
| 2005/0266195 A1 * | 12/2005 | Nonaka et al. | 428/40.1 |
| 2006/0216452 A1 * | 9/2006 | Tomita et al. | 428/40.1 |

FOREIGN PATENT DOCUMENTS

| | | |
|---|---|---|
| JP | 04-115944 A | 4/1992 |
| JP | 2001-246697 A | 9/2001 |
| JP | 2001-341263 A | 12/2001 |
| JP | 2002-178454 A | 6/2002 |
| JP | 2004-255704 A | 9/2004 |
| JP | 2006-299232 A | 11/2006 |

OTHER PUBLICATIONS

International Search Report for International Application No. PCT/JP2008/053861, dated Jun. 17, 2008, 4 pages.

* cited by examiner

*Primary Examiner* — Patricia Nordmeyer
(74) *Attorney, Agent, or Firm* — Brinks Hofer Gilson & Lione; G. Peter Nichols

(57) ABSTRACT

A release sheet is provided. The release sheet comprises: a base material having one surface and the other surface; and a release agent layer provided on the one surface of the base material. The release agent layer contains substantially no silicone compound and is constituted of a polymer material containing a polyolefine-based thermoplastic elastomer of which density is in the range of 0.80 to 0.90 g/cm$^3$. A Young's modulus of the release agent layer is in the range of 0.1 to 0.3 GPa. An arithmetic mean deviation of a profile Ra of the other surface of the base material is in the range of 100 to 1800 nm. This makes it possible to sufficiently suppress adverse effects on electric components and the like, prevent blocking from occurring when the release film is wound up in a rolled form and stored in this state, and exhibit superior releasability. A pressure-sensitive adhesive article is also provided.

11 Claims, No Drawings

RELEASE SHEET AND PRESSURE-SENSITIVE ADHESIVE ARTICLE

FIELD OF THE INVENTION

The present invention relates to a release sheet and a pressure-sensitive adhesive article.

BACKGROUND ART

Electric components such as relays, various switches, connectors, motors, and hard disk drives are widely used in various products.

In these electric components, pressure-sensitive adhesive sheets are attached for various purposes such as temporal tacking of parts during assembly and indication of the contents.

Such a pressure-sensitive adhesive sheet is generally constituted from a pressure-sensitive adhesive sheet base and a pressure-sensitive adhesive layer, and it is being kept in a state adhering to a release sheet until it is attached to an electric component for use.

On a surface of the release sheet (i.e., on the surface to be attached to the pressure-sensitive adhesive layer), a release agent layer is provided for improving releasability. Conventionally, a silicone resin has been used as a constituent material of the release agent layer (see, for example, JP-A 6-336574).

However, it is known that when such a release sheet is attached to a pressure-sensitive adhesive sheet, a silicone compound such as a low-molecular weight silicone resin, siloxane, a silicone oil, or the like contained in the release sheet (release agent layer) is transferred to the pressure-sensitive adhesive layer of the pressure-sensitive adhesive sheet. Further, normally, the release sheet is wound up in a rolled form after the production thereof. At that time, in this state, the back surface of the release sheet is in contact with the release agent layer thereof so that the silicone compound contained in the release agent layer is transferred to the back surface of the release sheet. In this regard, it is also known that the silicone compound transferred to the back surface of the release sheet is re-transferred to the surface of a pressure-sensitive adhesive sheet when a pressure-sensitive adhesive article (which is composed of a pressure-sensitive adhesive sheet and a release sheet attached thereto) is wound up in a rolled form in manufacturing the pressure-sensitive adhesive article. Therefore, in a case where the pressure-sensitive adhesive sheet, to which such a release sheet has adhered, is attached to an electric component, the silicone compound transferred to the pressure-sensitive adhesive layer or the surface of the pressure-sensitive adhesive sheet gradually vaporizes. In this regard, it is known that the vaporized silicone compound is deposited on, for example, a surface of an electric contact portion of the electric component due to electric arc or the like generated near the electric contact portion so that a minute silicone compound layer is formed thereon.

If such a silicone compound is deposited on a surface of an electric contact portion, there is a case where electric conductivity becomes poor.

Particularly, in a case where such a pressure-sensitive adhesive sheet is attached to a hard disk drive, the silicone compound transferred to a pressure-sensitive adhesive layer or a surface of the pressure-sensitive adhesive sheet gradually vaporizes and is then deposited on a magnetic head, a disk surface, or the like. Further, there is a possibility that deposition of such a minute silicone compound gives rise to adverse effects on reading and writing of data from and to a disk of the hard disk drive.

In order to solve the above problems, attempts to develop a non-silicone-based release agent containing no silicone compound have been made (see, for example, JP-A 2005-350650).

However, a release sheet using such a non-silicone-based release agent has poor releasability, and therefore does not have sufficiently property as the release sheet. Further, there is a case where the following problems occur in such a release sheet. The problems include blocking and wrinkle occurring when the release sheet is wound up in a rolled form.

SUMMARY OF THE INVENTION

It is therefore an object of the present invention to provide a release sheet which can sufficiently suppress adverse effects on electric components and the like, prevent blocking from occurring when the release sheet is wound up in a rolled form and stored in this state, and exhibit superior releasability. Further, it is another object of the present invention to provide a pressure-sensitive adhesive article having such a release sheet.

In order to achieve the above object, the present invention is directed to a release sheet. The release sheet comprises: a base material having one surface and the other surface; and a release agent layer provided on the one surface of the base material. The release sheet is characterized in that: the release agent layer contains substantially no silicone compound and the release agent layer is constituted of a polymer material containing a polyolefine-based thermoplastic elastomer of which density is in the range of 0.80 to 0.90 g/cm$^3$; a Young's modulus of the release agent layer is in the range of 0.1 to 0.3 GPa; and an arithmetic mean deviation of a profile Ra of the other surface of the base material is in the range of 100 to 1800 nm.

This makes it possible to provide a release sheet which can sufficiently suppress adverse effects on electric components and the like, prevent blocking from occurring when the release sheet is wound up in a rolled form and stored in this state, and exhibit superior releasability.

In the release sheet according to the present invention, it is preferred that the release agent layer has one surface and the other surface being in contact with the one surface of the base material, and an arithmetic mean deviation of a profile Ra of the one surface of the release agent layer is lower than 500 nm.

In the release sheet according to the present invention, it is also preferred that an average thickness of the release agent layer is in the range of 3.0 to 30.0 μm.

In the release sheet according to the present invention, it is also preferred that an average thickness of the base material is in the range of 5 to 300 μm.

In the release sheet according to the present invention, it is also preferred that the release sheet further comprises an intermediate layer, wherein the release agent layer is provided on the one surface of the base material through the intermediate layer.

In the release sheet according to the present invention, it is also preferred that an average thickness of the intermediate layer is in the range of 0.1 to 30.0 μm, and a Young's modulus of the intermediate layer is in the range of 0.1 to 5.0 GPa.

In the release sheet according to the present invention, it is also preferred that the Young's modulus of the intermediate layer is larger than the Young's modulus of the release agent layer.

In the release sheet according to the present invention, it is also preferred that the release sheet is used by being wound up in a rolled form.

In order to achieve the above another object, the present invention is directed to a pressure-sensitive adhesive article. The pressure-sensitive adhesive article comprises at least the release sheet described above and a pressure-sensitive adhesive layer. The release agent layer of the release sheet and the pressure-sensitive adhesive layer adhere to each other so as to be in contact with each other.

This makes it possible to provide a pressure-sensitive adhesive article which can sufficiently suppress adverse effects on electric components and the like, prevent blocking from occurring when a release sheet included in the pressure-sensitive adhesive article is wound up in a rolled form and stored in this state, and exhibit superior releasability.

DESCRIPTION OF EXEMPLARY EMBODIMENTS

Hereinbelow, the present invention will be described in detail based on preferred embodiments thereof.

A release sheet according to the present invention comprises a base material (release sheet base) and a release agent layer formed on the base material. If needed, the release sheet further comprises an intermediate layer between the releasing agent layer and the base material.

Generally, such a release sheet is stored in a state that it is wound up in a rolled form from the standpoints of storage property and transport or conveyance property thereof.

The base material has a function of supporting the release agent layer, and is constituted from, for example, a plastic film such as a polyester film (e.g., a polyethylene terephthalate film, a polybutylene terephthalate film, or the like), a polyolefin film (e.g., a polypropylene film, a polymethylpentene film, or the like), a polycarbonate film, or the like; a metal foil such as an aluminum foil, a stainless steel foil, or the like; paper such as glassine paper, woodfree paper, coated paper, impregnated paper, synthetic paper, or the like; or laminated paper obtained by coating such a paper base material with a thermoplastic resin such as polyethylene, or the like. Among these base materials, the plastic film such as polyethylene terephthalate film or the like is preferable for an electric component application in which clean property is particularly required. By using the plastic film for the base material, there are the following three advantages. Firstly, dust and the like is hardly to generate in processing and using the plastic film. Secondly, the use of the plastic film can suppress adverse effects on electric components such as a relay and the like. Thirdly, the use of the plastic film makes it possible to exhibit superior adequacy of die cutting of labels.

Hereinafter, in the present invention, a surface opposite to the surface of the base material on which the release agent layer is to be formed is simply referred to as "base-material back surface". The features of the present invention include a point that an arithmetic mean deviation of a profile Ra of the base-material back surface is in the range of 100 to 1800 nm. When the release sheet is wound up in a rolled form and stored in this state, the base-material back surface brings into contact with a surface of the release agent layer. In this case, such a point (feature) makes it possible to prevent blocking from occurring to between the base-material back surface and the surface of the release agent layer.

In the present invention, the arithmetic mean deviation of the profile Ra of the base-material back surface is preferably in the range of 100 to 1800 nm, more preferably in the range of 150 to 1200 nm, and even more preferably in the range of 180 to 600 nm. This makes it possible to conspicuously exhibit the effects described above. If the arithmetic mean deviation of the profile Ra of the base-material back surface is smaller than the above lower limit value, it may become difficult to sufficiently prevent blocking from occurring to between the base-material back surface and the surface of the release agent layer when the release film is wound up in a rolled form and stored in this state. On the other hand, if the arithmetic mean deviation of the profile Ra of the base-material back surface is larger than the above upper limit value, there is a case where the shape of the base-material back surface may be transferred to the surface of the release agent layer when the release film is wound up in the rolled form and stored in this state. Further, the shape transferred to the surface of the release agent layer may be transferred to a pressure-sensitive adhesive layer of a pressure-sensitive adhesive sheet when allowing the surface of the release agent layer to adhere to the pressure-sensitive adhesive layer. Due to the shape transferred to the pressure-sensitive adhesive layer, adhesive force of the pressure-sensitive adhesive layer is lowered than designed adhesive force. Therefore, there is a case where it becomes difficult to obtain a pressure-sensitive adhesive sheet having predetermined properties.

An average thickness of the base material is not particularly limited to a specific value, but is preferably in the range of 5 to 300 μm, and more preferably in the range of 10 to 200 μm.

By providing the release agent layer on the base material, it is possible to peel off the pressure-sensitive adhesive sheet from the release sheet.

The release agent layer is constituted of a material containing substantially no silicone compound. This makes it possible to prevent the transfer of a silicone compound from the release sheet to the pressure-sensitive adhesive layer of the pressure-sensitive adhesive article according to the present invention. As a result, it is possible to prevent the release of the silicone compound from the pressure-sensitive adhesive sheet after the pressure-sensitive adhesive sheet is attached to an adherend. Therefore, even when the adherend is electronic equipment such as a relay, the pressure-sensitive adhesive sheet is hard to give adverse effects to the adherend.

It is to be noted that the phrase "containing substantially no silicone compound" means that an amount of the silicone compound is preferably 500 μg/m$^2$ or less, and more preferably 100 μg/m$^2$ or less.

The features of the present invention also include two points as follows. The release agent layer is constituted of a polymer material containing a polyolefin-based thermoplastic elastomer of which density is in the range of 0.80 to 0.90 g/cm$^3$. A Young's modulus of the release agent layer is in the range of 0.1 to 0.3 GPa. In other words, the features of the present invention include one point that a polymer material containing a polyolefin-based thermoplastic elastomer having a predetermined density is used as a constituent material of the release agent layer. In addition to that, the features of the present invention include the other point that attention is paid to the Young's modulus of the release agent layer in order to improve the releasability thereof. By having such features, it is possible to realize superior releasability of the release sheet while keeping the adhesion property between the release agent layer and the base material described above.

By using both the release agent layer having such features and the base material having the arithmetic mean deviation of the profile Ra as described above, it is possible to provide superior releasability and prevent blocking from occurring when the release film is wound up in a rolled form and stored in this state. In other words, the release sheet according to the present invention can exhibit both the superior releasability and blocking resistance.

In the present invention as described above, the density of the polyolefin-based thermoplastic elastomer contained in the polymer material constituting the release agent layer is preferably in the range of 0.80 to 0.90 g/cm$^3$, more preferably in the range of 0.83 to 0.90 g/cm$^3$, and even more preferably in the range of 0.85 to 0.90 g/cm$^3$. This makes it possible to conspicuously exhibit the effects described above. In contrast, if the density of the polyolefin-based thermoplastic elastomer is smaller than the above lower limit value, even if the base-material back surface of the base material has the arithmetic mean deviation of the profile Ra as described above, the blocking may occur to between the base-material back surface and the surface of the release agent layer when the release film is wound up in a rolled form and stored in this state. On the other hand, if the density of the polyolefin-based thermoplastic elastomer exceeds the above upper limit value, the release agent layer becomes hard, and therefore it is impossible to obtain good releasability.

In the present invention, the Young's modulus of the release agent layer is preferably in the range of 0.10 to 0.30 GPa, more preferably in the range of 0.12 to 0.25 GPa, and even more preferably in the range of 0.15 to 0.20 GPa. This makes it possible to conspicuously exhibit the effects described above. In contrast, if the Young's modulus of the release agent layer is smaller than the above lower limit value, even if the base-material back surface of the base material has the arithmetic mean deviation of the profile Ra as described above, the blocking may occur to between the base-material back surface and the surface of the release agent layer when the release film is wound up in a rolled form and stored in this state. On the other hand, if the Young's modulus of the release agent layer exceeds the above upper limit value, it is impossible to obtain good releasability.

As described above, the release sheet according to the present invention has all of the following four features. A first feature is that the arithmetic mean deviation of the profile Ra of the base-material back surface is in the range of 100 to 1800 nm. A second feature is that the release agent layer contains substantially no silicone compound. A third feature is that the release agent layer is constituted of the polymer material containing the polyolefin-based thermoplastic elastomer of which density is in the range of 0.80 to 0.90 g/cm$^3$. A fourth feature is that the Young's modulus of the release agent layer is in the range of 0.1 to 0.3 GPa. This makes it possible to sufficiently suppress adverse effects on electric components such as relays, various switches, connectors, motors, hard disk drives, and the like, prevent blocking from occurring to between the base-material back surface and the surface of the release agent layer when the release film is wound up and stored in this state, and exhibit superior releasability.

The effects of the present invention as described above cannot be obtained if the release sheet lacks any one of the four features described above.

As the polyolefin-based thermoplastic elastomer of which density is in the range of 0.80 to 0.90 g/cm$^3$ and which is contained in the polymer material constituting the release agent layer, an olefin homopolymer and a copolymer produced by copolymerizing an olefin and a reactive monomer other than the olefin can be used. Examples of such a polyolefin-based thermoplastic elastomer include: a homopolymer of α-olefin such as ethylene, propylene, butene, hexene, octene, and the like; a copolymer between such α-olefins; a copolymer produced by copolymerizing norbornene and the α-olefin such as ethylene; and the like. These polymers may be used singly or in combination of two or more of them. Among these polymers, it is preferred that a copolymer produced by copolymerizing ethylene and the α-olefin having a carbon number of 3 to 10 is used.

If needed, a thermoplastic elastomer other than the polyolefin-based thermoplastic elastomer of which density is in the range of 0.80 to 0.90 g/cm$^3$ may be added to the polymer material. Examples of the thermoplastic elastomer other than the polyolefin-based thermoplastic elastomer of which density is in the range of 0.80 to 0.90 g/cm$^3$ include a polyolefin-based thermoplastic elastomer of which density is in the range of 0.901 to 0.97 g/cm$^3$. Such a polyolefin-based thermoplastic elastomer is constituted of polyethylene, polypropylene, polybutene, poly(4-methyl-1-pentene), or the like. These polymers may be used singly or in combination of two or more of them. By combination of these polymers, it is possible to adjust the Young's modulus of the release agent layer so that it falls within a predetermined range.

A mass average molecular weight of the polyolefin-based thermoplastic elastomer of which density is in the range of 0.80 to 0.90 g/cm$^3$ and which is contained in the polymer material constituting the release agent layer is preferably in the range of 10,000 to 1,000,000, and more preferably in the range of 20,000 to 100,000. This makes it possible to efficiently improve the releasability, and prevent blocking from occurring to between the base-material back surface and the surface of the release agent layer when the release film is wound up and stored in this state.

It is preferred that the other surface opposite to one surface of the release agent layer on which the base material is to be formed is flat and smooth.

An arithmetic mean deviation of a profile Ra of the other surface (hereinafter, simply referred to as "the surface of the release agent layer") opposite to the one surface of the leasing agent layer on which the base material is to be formed is preferably smaller than 500 nm, and more preferably in the range of 100 to 400 nm. If the arithmetic mean deviation of the profile Ra of the surface of the release agent layer is too large, smoothness of the surface of the release agent layer is lowered so that the shape of the surface of the release agent layer becomes remarkable. Therefore, there is a case where the shape of the surface of the release agent layer is transferred to a pressure-sensitive adhesive layer of a pressure-sensitive adhesive sheet when the surface of the release agent layer is attached to the pressure-sensitive adhesive layer. Due to the shape transferred to the pressure-sensitive adhesive layer, adhesive force of the pressure-sensitive adhesive layer is lowered than designed adhesive force. Therefore, there is a case where it becomes difficult to obtain a pressure-sensitive adhesive sheet having predetermined properties. Further, a contact area between the surfaces of the release agent layer and the pressure-sensitive adhesive layer is increased. Therefore, there is a case where it is difficult to obtain sufficiently releasability depending on a kind of pressure-sensitive adhesive agent constituting the pressure-sensitive adhesive sheet.

An average thickness of the release agent layer is not particularly limited to a specific value, but is preferably in the range of 3 to 30 μm, more preferably in the range of 5 to 30 μm, and even more preferably in the range of 5 to 25 μm. If the average thickness of the release agent layer is less than the above lower limit value, there is a case where releasability in peeling off the pressure-sensitive adhesive sheet from the release sheet is poor. On the other hand, if the average thickness of the release agent layer exceeds the above upper limit value, there is a case where blocking is likely to occur to between the surface of the release agent layer and the base-material back surface of the release sheet (base material)

when the release sheet is wound up in a rolled form, which results in the case that the releasability of the release agent layer is deteriorated due to the blocking.

The release agent layer may further contain another resin component and/or various additives such as plasticizers, stabilizers, and the like.

Further, in this embodiment, the release agent layer is provided on the base material through an intermediate layer. This makes it possible to improve adhesive property between the release agent layer and the base material. Furthermore, when the release sheet is peeled off from the pressure-sensitive adhesive sheet, it is possible to reliably prevent peeling from occurring in a boundary surface between the release agent layer and the base material. Additionally, it is possible to reliably prevent a part of the release agent layer from adhering to or remaining on the pressure-sensitive adhesive layer.

An average thickness of the intermediate layer is preferably in the range of 0.1 to 25 μm, and more preferably in the range of 0.2 to 20 μm.

A Young's modulus of the intermediate layer is preferably in the range of 0.1 to 3.0 GPa, and more preferably in the range of 0.2 to 3.0 GPa.

If the intermediate layer has the average thickness and the Young's modulus falling within the above range, it is possible to effectively reduce a difference between elasticities of the whole base material and the whole release agent layer. As a result, it is possible to effectively prevent peeling not to intend from occurring to between the base material and the release agent layer. Further, it is possible to obtain high releasability of the release sheet. In particular, even if the average thickness of the release agent layer is small (thin), it is possible to obtain high releasability of the release agent layer. Furthermore, it is also possible to efficiently prevent the releasability from being lowered due to heat or time degradation.

It is preferred that the Young's modulus of the intermediate layer is larger than that of the release agent layer. By satisfying such a relation, it is possible to improve the adhesive property between the base material and the release agent layer. As a result, it is possible to reliably prevent peeling not to intend from occurring to between the base material and the release agent layer. In addition to that, it is also possible to obtain superior releasability of the release agent layer.

Examples of a constituent material of the intermediate layer include polyethylene, polypropylene, polyurethane, polyacrylate, and the like.

In this embodiment, the intermediate layer may be used for the purpose other than the above purpose. Further, the intermediate layer may be a barrier layer which prevents components from being moved between the base material and the release agent layer. Furthermore, the release sheet may have two or more intermediate layers. In a case where the release sheet includes two or more intermediate layers, a Young's modulus of each of the intermediate layers as described above may be gradually increased from a release agent layer side to a base material side among the intermediates layers in the release sheet. This makes it possible to exhibit superior releasability.

In this specification, the Young's modulus of each of the release agent layer and the intermediate layer is a value which is measured at a position of a press depth of 1 μm from the surface of each of the release agent layer and the inter mediate layer under a condition of 23° C. by using Nanoindenter (manufactured by MTS Systems Corp. (TestWorks-4)). In this regard, in a case where a thickness of each of the release agent layer and the intermediate layer is smaller than 2 μm, the Young's modulus of each of the release agent layer and the intermediate layer is a value which is measured at a position of the press depth of a half thickness of each of the release agent layer and the intermediate layer.

The release sheet as described above is produced as follows. First, a base material is prepared, and then a material constituting an intermediate layer is supplied onto the base material to form the intermediate layer. Thereafter, a release agent is supplied onto the intermediate layer to form a release agent layer. In this way, the release sheet is produced.

Examples of a method for applying (supplying) the material constituting the intermediate layer onto the base material and the release agent onto the intermediate layer include various conventional methods such as an extrusion coating (supplying) method, a gravure coating method, a bar coating method, a spray coating method, a spin coating method, a knife coating method, a roll coating method, a die coating method, and the like.

Hereinafter, a description will be made on a pressure-sensitive adhesive article according to the present invention.

The pressure-sensitive adhesive article according to the present invention has a structure in which a pressure-sensitive adhesive sheet adheres to a release sheet. The pressure-sensitive adhesive sheet is constituted from a pressure-sensitive adhesive sheet base and a pressure-sensitive adhesive layer provided on the pressure-sensitive adhesive sheet base. The release sheet is constituted from a release agent layer, an intermediate layer and a base material (a release sheet base) as described above. In this pressure-sensitive adhesive article, the pressure-sensitive adhesive layer is in contact with the release agent layer. In the case of such a pressure-sensitive adhesive article, the pressure-sensitive adhesive sheet can be peeled off from the release sheet. After the peeling-off of the pressure-sensitive adhesive sheet, the pressure-sensitive adhesive sheet is attached to adherend.

The pressure-sensitive adhesive sheet base has a function of supporting the pressure-sensitive adhesive layer, and is constituted from, for example, a plastic film such as a polyethylene terephthalate film, a polybutylene terephthalate film, a polyethylene film, a polypropylene film, a polymethylpentene film, a polycarbonate film, or the like; a metal foil such as an aluminum foil, a stainless steel foil, or the like; paper such as lint-free paper, synthetic paper, or the like; or a laminate body of two or more of them.

Among them, the pressure-sensitive adhesive sheet base is particularly preferably constituted from the plastic film such as the polyester film (e.g., the polyethylene terephthalate film or the polybutylene terephthalate film) or the polypropylene film, or so-called lint-free paper from which less dust particles are generated (see, for example, JP-B 6-11959). When the pressure-sensitive adhesive sheet base is constituted from the plastic film or the lint-free paper, dust particles and the like are less likely to be generated when the pressure-sensitive adhesive sheet is manufactured and used so that electronic components such as relays are less likely to be adversely affected. In addition, when the pressure-sensitive adhesive sheet base is constituted from the plastic film or the lint-free paper, the pressure-sensitive adhesive sheet can be easily formed into a desired shape by cutting or die cutting. Further, in a case where the plastic film is used as the pressure-sensitive adhesive sheet base, the polyethylene terephthalate film is particularly preferable as the plastic film because the polyethylene terephthalate film has advantages that generation of the dust particles is hardly to occur and that generation of gas during heating is also hardly to occur.

An average thickness of the pressure-sensitive adhesive sheet base is not particularly limited to a specific value, but is preferably in the range of 5 to 300 μm, and more preferably in the range of 10 to 200 μm.

Printing or typing may be applied to a surface of the pressure-sensitive adhesive sheet base (i.e., to the surface opposite to the surface on which the pressure-sensitive adhesive layer is to be laminated). Further, a surface treatment may be made to the surface of the pressure-sensitive adhesive sheet base for the purpose of, for example, improving adhesion of printing or typing to the surface of the pressure-sensitive adhesive sheet base. Further, the pressure-sensitive adhesive sheet may also serve as a label.

The pressure-sensitive adhesive layer is constituted of a pressure-sensitive adhesive composition mainly containing a pressure-sensitive adhesive.

Examples of the pressure-sensitive adhesive include an acrylic pressure-sensitive adhesive, a polyester-based pressure-sensitive adhesive, and an urethane-based pressure-sensitive adhesive.

For example, in a case where the acrylic pressure-sensitive adhesive is used as the pressure-sensitive adhesive, the acrylic pressure-sensitive adhesive can be constituted of a polymer or a copolymer mainly containing a main monomer component for imparting tackiness, a comonomer component for imparting adhesiveness or cohesive force, and a functional group-containing monomer component for improving crosslinking site or adhesiveness.

Examples of the main monomer component include: acrylic alkyl esters such as ethyl acrylate, butyl acrylate, amyl acrylate, 2-ethylhexyl acrylate, octyl acrylate, cyclohexyl acrylate, benzyl acrylate, methoxyethyl acrylate, and the like; and methacrylic alkyl esters such as butyl methacrylate, 2-ethylhexyl methacrylate, cyclohexyl methacrylate, benzyl methacrylate, and the like.

Examples of the comonomer component include methyl acrylate, methyl methacrylate, ethyl methacrylate, vinyl acetate, styrene, acrylonitrile, and the like.

Examples of the functional group-containing monomer component include: carboxyl group-containing monomers such as acrylic acid, methacrylic acid, maleic acid, and itaconic acid; hydroxyl group-containing monomers such as 2-hydroxyethyl acrylate, hydroxyethyl methacrylate, 2-hydroxypropyl acrylate, 2-hydroxypropyl methacrylate, N-methylolacrylamide, and the like; acrylamide; methacrylamide; glycidyl methacrylate; and the like.

By containing these components, tackiness and cohesive force of the pressure-sensitive adhesive composition are improved. Further, such acrylic resin usually have no unsaturated bond in its molecule, and therefore the pressure-sensitive adhesive composition containing the acrylic pressure-sensitive adhesive has improved stability with respect to light or oxygen. Further, by appropriately selecting the kind of monomer or the molecular weight of the pressure-sensitive adhesive, it is possible to obtain a pressure-sensitive adhesive composition having quality and properties suitable for its purpose of use.

The pressure-sensitive adhesive composition may be either of a crosslinked type to which crosslinking treatment has been carried out or a non-crosslinked type to which crosslinking treatment has not been carried out. However, the crosslinked type is preferably used. By using the crosslinked type pressure-sensitive adhesive composition, it is possible to form the pressure-sensitive adhesive layer having further excellent cohesive force.

Examples of a crosslinking agent to be used for the crosslinked type pressure-sensitive adhesive composition include an epoxy-based compound, an isocyanate compound, a metal chelate compound, a metal alkoxide, a metal salt, an amine compound, a hydrazine compound, an aldehyde compound, and the like.

If necessary, the pressure-sensitive adhesive composition to be used in the present invention may contain various additives such as plasticizers, tackifiers, stabilizers, and the like.

An average thickness of the pressure-sensitive adhesive layer is not particularly limited to a specific value, but is preferably in the range of 5 to 200 μm, and more preferably in the range of 10 to 100 μm.

The pressure-sensitive adhesive sheet as described above is produced as follows. First, a pressure-sensitive adhesive sheet base is prepared, and then a pressure-sensitive adhesive composition is supplied onto the pressure-sensitive adhesive sheet base to form a pressure-sensitive adhesive layer. In this way, the pressure-sensitive adhesive sheet is produced.

Examples of a method for supplying a pressure-sensitive adhesive composition onto a pressure-sensitive adhesive sheet base include various conventional methods such as a gravure coating method, a bar coating method, a spray coating method, a spin coating method, a knife coating method, a roll coating method, a die coating method, and the like.

In this case, the pressure-sensitive adhesive composition may be of a solvent type, an emulsion type, a hot-melt type, or the like.

Then, the thus obtained pressure-sensitive adhesive sheet and release sheet are laminated together so that the pressure-sensitive adhesive layer and the release agent layer are in contact with each other, thereby enabling a pressure-sensitive adhesive article to be obtained.

According to such a method of producing the pressure-sensitive adhesive article, it is possible to produce a pressure-sensitive adhesive article without exposing the release sheet in a high temperature condition during the production thereof. Further, it becomes possible to avoid a situation that the pressure-sensitive adhesive article suffers from adverse effects due to the solvent which is used in forming the pressure-sensitive adhesive layer on the pressure-sensitive adhesive sheet base.

Alternatively, the pressure-sensitive adhesive article may be produced by forming the pressure-sensitive adhesive layer on the release agent layer of the release sheet, and then laminating the pressure-sensitive adhesive sheet base on the pressure-sensitive adhesive layer.

Although the release sheet and the pressure-sensitive adhesive article according to the present invention have been described with reference to the preferred embodiments thereof, the present invention is not limited thereto. For example, the pressure-sensitive adhesive article according to the present invention may have such a structure that two pressure-sensitive adhesive layers are formed on both surfaces of the pressure-sensitive adhesive sheet base and release sheets are respectively attached to surfaces of each of the pressure-sensitive adhesive layers.

Further, although the release sheet according to the above embodiment is constituted from the release agent layer, the intermediate layer and the base material, the intermediate layer may be omitted in the present invention.

Furthermore, although the release sheet according to the above embodiment is constituted from the release agent layer, the intermediate layer and the base material, the release sheet may be formed from a resin film that have both functions of the release agent layer and the base material.

Furthermore, although the pressure-sensitive adhesive article according to the above embodiment has such a structure that the pressure-sensitive adhesive sheet is laminated on the release sheet, the pressure-sensitive adhesive article according to the present invention may have such a structure that a release agent layer is formed on one surface of a base material and a pressure-sensitive adhesive layer is formed on the other surface of the base material so that the structure may be in a rolled form or a sheet form. The release agent layer is laminated on the pressure-sensitive adhesive layer so as to be in contact with each other.

The applications of the release sheet and the pressure-sensitive adhesive article according to the present invention are not limited to the above-mentioned electric components such as relays, various switches, connectors, motors, hard disk drives, and the like.

EXAMPLES

Hereinbelow, actual examples of the release sheet according to the present invention will be described.

1. Production of Release Sheet

Example 1

[1] Formation of Intermediate Layer

First, a polyethylene terephthalate (PET) film (manufactured by Mitsubishi Plastics Inc. under the trade name of "Diafoil E130") was prepared as a base material. An average thickness of the PET film was 26 μm, and an arithmetic mean deviation of a profile Ra of a base-material back surface of the PET film was 387 nm.

Next, a low-density polyethylene (manufactured by Japan Polyethylene Corporation under the trade name of "NovatecLD LC605Y", a density thereof is 0.919 g/cm$^3$) was extruding-coated on a surface opposite to the base-material back surface of the prepared base material so that an average thickness thereof was 15 μm to obtain an intermediate layer. A Young's modulus of the formed intermediate layer was 0.36 GPa.

[2] Formation of Release agent layer

Next, a low-density polyethylene (manufactured by Japan Polyethylene Corporation under the trade name of "NovatecLD LC800", a density thereof is 0.916 g/cm$^3$) of 60 parts by weight was mixed with a copolymer of ethylene and propylene (manufactured by Mitsui Chemicals, Inc. under the trade name of "TafmerP0275G", a density thereof is 0.856 g/cm$^3$) of 40 parts by weight to obtain a mixture material as a material for forming a release agent layer. Then, the mixture material was extruding-coated on the formed intermediate layer so that an average thickness thereof was 10 μm. Thereafter, a surface of the extruding-coated mixture material was smoothed by a cooling laminate roll to obtain the release agent layer.

By carrying out processes as described above, a release sheet was obtained.

Example 2

A release sheet was produced in the same manner as in the Example 1 except that the PET film was changed to a PET film to which a sandblast treatment was subjected as the base material. An average thickness of the PET film was 38 μm, and an arithmetic mean deviation of a profile Ra of a base-material back surface of the PET film was 471 nm.

Example 3

A release sheet was produced in the same manner as in the Example 1 except that the mixture material was changed to a mixture material which was obtained by mixing a low-density polyethylene (manufactured by Japan Polyethylene Corporation under the trade name of "NovatecLD LC800", a density thereof is 0.916 g/cm$^3$) of 50 parts by weight and a copolymer of ethylene and propylene (manufactured by Mitsui Chemicals, Inc. under the trade name of "TafmerP0275G", a density thereof is 0.856 g/cm$^3$) of 50 parts by weight as the material for forming the release agent layer.

Example 4

A release sheet was produced in the same manner as in the Example 1 except for the following points. Firstly, the PET film was changed to a PET film to which a sandblast treatment was subjected as the base material. An average thickness of the PET film was 38 μm, and an arithmetic mean deviation of a profile Ra of a base-material back surface of the PET film was 471 nm. Secondly, the mixture material was changed to a mixture material which was obtained by mixing a low-density polyethylene (manufactured by Japan Polyethylene Corporation under the trade name of "NovatecLD LC800", a density thereof is 0.916 g/cm$^3$) of 70 parts by weight and a copolymer of ethylene and propylene (manufactured by Mitsui Chemicals, Inc. under the trade name of "TafmerP0275G", a density thereof is 0.856 g/cm$^3$) of 30 parts by weight as the material for forming the release agent layer.

Example 5

A release sheet was produced in the same manner as in the Example 1 except that the PET film was changed to a PET film (manufactured by TORAY INDUSTRIES, INC. under the trade name of "LumirrorX44") as the base material, and a release agent layer was formed on the intermediate layer so that an arithmetic mean deviation of a profile of the release agent layer was shown in Table 1. An average thickness of the PET film was 38 μm, and an arithmetic mean deviation of a profile Ra of a base-material back surface of the PET film was 201 nm.

Example 6

A release sheet was produced in the same manner as in the Example 1 except that the low-density polyethylene was changed to polyurethane as the material for forming the intermediate layer. In this regard, a Young's modulus of the formed intermediate layer was 0.20 GPa.

Example 7

First, a polyethylene terephthalate (PET) film (manufactured by Mitsubishi Plastics Inc. under the trade name of "DiafoilE130") was prepared as a base material. An average thickness of the PET film was 26 μm, and an arithmetic mean deviation of a profile Ra of a base-material back surface of the PET film was 387 nm.

Next, a low-density polyethylene (manufactured by Japan Polyethylene Corporation under the trade name of "NovatecLD LC800", a density thereof is 0.916 g/cm$^3$) of 60 parts by weight was mixed with a copolymer of ethylene and propylene (manufactured by Mitsui Chemicals, Inc. under the trade name of "TafmerP0275G", a density thereof is 0.856 g/cm$^3$)

of 40 parts by weight to obtain a mixture material. Then, the mixture material was extruding-coated on a surface opposite to the base-material back surface of the prepared base material so that an average thickness thereof was 10 μm. Thereafter, a surface of the extruding-coated mixture material was smoothed by a cooling laminate roll to obtain a release agent layer.

By carrying out processes as described above, a release sheet was obtained.

Example 8

A release sheet was produced in the same manner as in the Example 1 except that a release agent layer is formed the intermediate layer so that an average thickness of the release agent layer was 20 μm.

Comparative Example 1

A release sheet was produced in the same manner as in the Example 1 except that the PET film was changed to a PET film (manufactured by TORAY INDUSTRIES, INC. under the trade name of "LumirrorS28") as the base material. An average thickness of the PET film was 38 μm, and an arithmetic mean deviation of a profile Ra of a base-material back surface of the PET film was 29 nm.

paper as the base material. An average thickness of the glassine paper was 80 μm (basis weight: 64 g/m$^2$), and an arithmetic mean deviation of a profile Ra of a base-material back surface of the glassine paper was 2010 nm.

In the release sheet produced in each of the Examples 1 to 7 and the Comparative Examples 1 to 4, the average thickness of the base material, the arithmetic mean deviation of a profile Ra of the base-material back surface of the base material, the average thickness of the intermediate layer, the Young's modulus of the intermediate layer, the average thickness of the release agent layer, the Young's modulus of the release agent layer, and the arithmetic mean deviation of the profile Ra of the surface of the release agent layer were shown in Table 1.

In each of the intermediate layer and the release agent layer, the Young's modulus was measured at a position of a press depth of 1 μm from the surface of each of the intermediate layer and the release agent layer by using Nanoindenter (manufactured by MTS Systems Corp. (TestWorks-4)). Further, in each of the surface of the release agent layer and the base-material back surface of the base material, the arithmetic mean deviation of the profile was measured by using a contact average roughness meter.

TABLE 1

|  | Base material | | Release agent layer | | | Intermediate layer | |
|---|---|---|---|---|---|---|---|
|  | Average thickness [μm] | Arithmetic mean deviation of profile Ra[nm] | Average thickness [μm] | Young's modulus [GPa] | Arithmetic mean deviation of profile Ra[nm] | Average thickness [μm] | Youngs modulus [GPa] |
| Ex. 1 | 26 | 387 | 10 | 0.18 | 298 | 15 | 0.36 |
| Ex. 2 | 38 | 471 | 10 | 0.18 | 298 | 15 | 0.36 |
| Ex. 3 | 26 | 387 | 10 | 0.15 | 298 | 15 | 0.36 |
| Ex. 4 | 38 | 471 | 10 | 0.23 | 288 | 15 | 0.36 |
| Ex. 5 | 38 | 201 | 10 | 0.18 | 310 | 15 | 0.36 |
| Ex. 6 | 26 | 387 | 10 | 0.18 | 298 | 15 | 0.20 |
| Ex. 7 | 26 | 387 | 10 | 0.18 | 298 |  |  |
| Ex. 8 | 26 | 387 | 20 | 0.18 | 298 | 15 | 0.36 |
| Comp. Ex. 1 | 38 | 29 | 10 | 0.18 | 298 | 15 | 0.36 |
| Comp. Ex. 2 | 16 | 387 | 10 | 0.06 | 320 | 15 | 0.36 |
| Comp. Ex. 3 | 26 | 387 | 10 | 0.36 | 106 | — | — |
| Comp. Ex. 4 | 100 | 2010 | 10 | 0.18 | 360 | 15 | 0.36 |

Comparative Example 2

A release sheet was produced in the same manner as in the Example 1 except that the mixture material was changed to only a copolymer of ethylene and propylene (manufactured by Mitsui Chemicals, Inc. under the trade name of "TafmerP0275G", a density thereof is 0.856 g/cm$^3$) as the material for forming the release agent layer.

Comparative Example 3

A release sheet was produced in the same manner as in the Example 7 except that the mixture material was changed to only a low-density polyethylene (manufactured by Japan Polyethylene Corporation under the trade name of "NovatecLD LC605Y", a density thereof is 0.919 g/cm$^3$) as the material for forming the release agent layer.

Comparative Example 4

A release sheet was produced in the same manner as in the Example 1 except that the PET film was changed to a glassine 2. Production of Pressure-Sensitive Adhesive Article First, an acryl-based pressure-sensitive adhesive (manufactured by Lintec Corporation under the trade name of "PLshin") was supplied onto one surface of a polyethylene terephthalate (PET) film having an average thickness of 50 μm by using a testcoater, and was then dried by heating at 120° C. for 60 seconds to form a pressure-sensitive adhesive layer having a thickness of 23 μm. In this way, a pressure-sensitive adhesive sheet was produced.

Thereafter, the release sheet and pressure-sensitive adhesive sheet obtained in each of the Examples 1 to 7 and the Comparative Examples 1 to 4 were laminated together so that the release agent layer and the pressure-sensitive adhesive layer were in contact with each other to obtain a pressure-sensitive adhesive article.

3. Evaluation
(Release Force Test)

For each of the pressure-sensitive adhesive articles using the release sheets of the Examples 1 to 7 and the Comparative Examples 1 to 4, a release force of the release sheet was measured.

The release force was measured according to the JIS-Z0237 by cutting the pressure-sensitive adhesive article to have the width of 20 mm and the length of 200 mm, fixing the release sheet to a tensile tester, and pulling the pressure-sensitive adhesive sheet using the tensile tester at a peel rate of 300 mm/min in the 180° direction. The measurement result of the release force was evaluated according to the following three criteria.

A: The release force is lower than 75 (mN/20 mm), which provides superior releasability.

B: The release force is 75 (mN/20 mm) or more but lower than 100 (mN/20 mm), which provides no problem on the actual use.

C: The release force is 100 (mN/20 mm) or more, which provides problems on the actual use.

(Blocking Resistance Evaluation)

In the release sheet obtained in each of the Examples 1 to 7 and the Comparative Examples 1 to 4, two sub-release sheets obtained by cutting the release sheet to the width of 25 mm were laminated to each other so as to be in contact with the surface of the release agent layer of one sub-release sheet and the base-material back surface of the base material of the other sub-release sheet. Next, load was applied to the laminated two sub-release sheets, which was left under an atmosphere of 60° C. for 3 days.

Thereafter, tensile share force was measured by fixing the one sub-release sheet of the laminated two sub-release sheets to a tensile tester, and pulling the other sub-release sheet using the tensile tester at a peel rate of 300 mm/min in the 180° direction. The measurement result of the tensile share force was evaluated according to the following three criteria.

A: The tensile share force is lower than 9.0 N/cm$^2$, which enables to smoothly peel.

B: The tensile share force is 9.0 N/cm$^2$ or more but lower than 12.0 N/cm$^2$, which provides slight blocking but no problem on the actual use.

C: The tensile share force is 12.0 N/cm$^2$ or more, which provides remarkable blocking.

(Adhesive Property between Base Material and Release Agent Layer)

In the release sheet obtained in each of the Examples 1 to 7 and the Comparative Examples 1 to 4, adhesive property between the base material and the release agent layer was measured by using a rub-off method. The measurement result of the adhesive property was evaluated according to the following three criteria.

A: The release agent layer does not fall from the base material. This result is good.

B: A part of the release agent layer falls from the base material. This result provides no problem on the actual use.

C: The release agent layer falls from the base material. This result provides problems on the actual use.

(Arithmetic Mean Deviation of Profile Ra of Surface of Release Agent Layer after Blocking Resistance Evaluation)

In the release sheet obtained in each of the Examples 1 to 7 and the Comparative Examples 1 to 4, after the blocking resistance evaluation described above, an arithmetic mean deviation of a profile Ra of the surface of the release agent layer of the release sheet was measured by using a contact average roughness meter. The measurement result of the arithmetic mean deviation of the profile Ra was evaluated according to the following two criteria.

A: The arithmetic mean deviation of the profile Ra is lower than 500 nm.

C: The arithmetic mean deviation of the profile Ra is 500 nm or more.

These results were shown in Table 2.

TABLE 2

| | Release force test | Blocking resistance evaluation | Adhesive property between base material and release agent layer | Arithmetic mean deviation of profile Ra(nm) of surface of release agent layer after blocking resistance evaluation |
|---|---|---|---|---|
| Ex. 1 | A | A | A | A |
| Ex. 2 | A | A | A | A |
| Ex. 3 | A | A | A | A |
| Ex. 4 | A | A | A | A |
| Ex. 5 | A | A | A | A |
| Ex. 6 | A | A | B | A |
| Ex. 7 | A | A | B | A |
| Ex. 8 | A | B | A | A |
| Comp. Ex. 1 | B | C | B | C |
| Comp. Ex. 2 | B | C | C | C |
| Comp. Ex. 3 | C | A | A | A |
| Comp. Ex. 4 | A | A | B | C |

As can be seen from Table 2, in each of the release sheets according to the present invention (that is, the Examples 1 to 7), the surface of the release agent layer was smooth. Therefore, the release sheets according to the present invention had superior releasability and blocking resistance. On the other hand, in the cases of the release sheets of the Comparative Examples 1 to 4, satisfactory results could not be obtained. Further, the release sheets according to the present invention did not contain a silicone compound. This indicated that the release sheets (pressure-sensitive adhesive articles) according to the present invention were hard to give adverse effects to electric components such as relays.

INDUSTRIAL APPLICABILITY

According to the present invention, it is possible to provide a release sheet which can sufficiently suppress adverse effects on electric components such as relays, various switches, connectors, motors, and hard disk drives, prevent blocking from occurring when the release film is wound up in a rolled form and stored in this state, and exhibit superior releasability. Further, it is also possible to provide a pressure-sensitive adhesive article having such a release sheet. Therefore, the present invention has industrial applicability. This application claims a priority to Japanese Patent Application No. 2007-071638 filed on Mar. 19, 2007 which is hereby expressly incorporated by reference herein in its entirety.

What is claimed is:

1. A release sheet, comprising:
   a base material having one surface and the other surface; and
   a release agent layer provided on the one surface of the base material,
   wherein the release sheet is characterized in that:
   the release agent layer contains substantially no silicone compound and the release agent layer is constituted of a polymer material containing a first polyolefin-based thermoplastic elastomer of which density is in the range of 0.80 to 0.90 g/cm$^3$;
   an average thickness of the release agent layer is in the range of 5.0 to 30.0 μm;
   a Young's modulus of the release agent layer is in the range of 0.1 to 0.3 GPa; and
   an arithmetic mean deviation of a profile Ra of the other surface of the base material is in the range of 100 to 1800 nm.

2. The release sheet as claimed in claim 1, wherein the release agent layer has one surface and the other surface being in contact with the one surface of the base material, and an arithmetic mean deviation of a profile Ra of the one surface of the release agent layer is in the range of 100 to 400 nm.

3. The release sheet as claimed in claim 1, wherein the average thickness of the release agent layer is in the range of 10.0 to 30.0 μm.

4. The release sheet as claimed in claim 1, wherein an average thickness of the base material is in the range of 5 to 300 μm.

5. The release sheet as claimed in claim 1 further comprising an intermediate layer, wherein the release agent layer is provided on the one surface of the base material through the intermediate layer.

6. The release sheet as claimed in claim 5, wherein an average thickness of the intermediate layer is in the range of 0.1 to 30.0 μm, and a Young's modulus of the intermediate layer is in the range of 0.1 to 5.0 GPa.

7. The release sheet as claimed in claim 5, wherein the Young's modulus of the intermediate layer is larger than the Young's modulus of the release agent layer.

8. The release sheet as claimed in claim 1, wherein the release sheet is used by being wound up in a rolled form.

9. A pressure-sensitive adhesive article, comprising:
   at least the release sheet defined in claim 1 and a pressure-sensitive adhesive layer,
   wherein the release agent layer of the release sheet and the pressure-sensitive adhesive layer adhere to each other so as to be in contact with each other.

10. The release sheet as claimed in claim 1, wherein the polymer material further contains:
    a copolymer produced by copolymerizing an ethylene and α-olefin having a carbon number 3 to 10, the copolymer of which density being in the range of 0.80 to 0.90 g/cm$^3$; and
    a second polyolefin-based thermoplastic elastomer of which density is in the range of 0.901 to 0.97 g/cm$^3$.

11. The release sheet as claimed in claim 1, wherein the base material is constituted from a polyester film.

* * * * *